United States Patent Office 2,952,702
Patented Sept. 13, 1960

2,952,702
PREPARATION OF POLYHALO ARYLOXY ACETIC ACID ESTERS

Alexander Galat, Yonkers, N.Y., assignor to Morton Chemical Company, Chicago, Ill., a corporation of Delaware No Drawing. Original application Nov. 12, 1952, Ser. No. 320,153. Divided and this application Feb. 27, 1957, Ser. No. 642,680

6 Claims. (Cl. 260—473)

This invention relates principally to a new and novel process for the preparation of polyhalo aryloxy acetic acid esters.

This application is a division of my copending application, Serial Number 320,153, filed November 12, 1952, and now abandoned.

It has been proposed to hydrolyze 1,2,4,5-tetrachlorobenzene at elevated temperatures but at atmospheric pressure through use of sodium hydroxide in a polyhydric alcohol such as glycerol or a glycol. Such a process is quite satisfactory with respect to operability and yield but suffers from the disadvantage that large quantities of the reaction medium are necessary for successful results, for example, at least 2.0 pounds of the polyhydric alcohol per pound of 1,2,4,5-tetrachlorobenzene, preferably about 3.5 pounds of the polyhydric alcohol per pound of 1,2,4,5-tetrachlorobenzene. This means that the reaction medium is several times as valuable as the reactant employed or the product produced by the reaction so that the successful operation of the process is largely an exercise in solvent recovery, the production of 2,4,5-trichlorophenol being incidental. Also, because of the large volume of reaction medium required, equipment of relatively great capacity is required to achieve only moderate production of the desired phenol.

One object of this invention is to provide a new and novel process for the preparation of esters of polyhalophenoxyacetic acids.

Another object of this invention is to provide a new and novel process for the direct preparation of esters of polyhalophenoxyacetic acids from polyhalobenzenes.

An additional object of this invention is to provide a new and novel process for the preparation of esters of 2,4,5-trichlorophenoxyacetic acid (2,4,5-T).

Another object of this invention is to provide a new and novel process for the direct preparation of 2,4,5-T esters from 1,2,4,5-tetrachlorobenzene.

Additional objects of this invention will become apparent as the description thereof proceeds.

Broadly and briefly, in accordance with one specific aspect of this invention, 1,2,4,5-tetrachlorobenzene is hydrolyzed to 2,4,5-trichlorophenol by heating the chlorinated hydrocarbon with an alkali metal hydroxide such as sodium hydroxide or potassium hydroxide in a reaction medium consisting of a polyhydric alcohol containing a material unreactive with the reaction medium and the reactants and capable of entraining water on distillation. When the hydrolysis is complete or is essentially complete (as indicated by complete or essentially complete solubility of the reaction mixture in water), the phenol may be isolated from the reaction medium by classical procedures. However, the reaction mixture resulting after hydrolysis is complete or essentially complete contains the alkali metal salt of the required phenol in an anhydrous condition and dissolved in a medium that is eminently suitable for bringing about the reaction between the phenate and a chloro-aliphatic acid ester such as a chloroacetic acid ester. Accordingly, instead of isolating the phenol, the reaction mixture may be heated with an ester of a chloro-aliphatic acid such as a chloroacetic acid ester to form the corresponding ester of 2,4,5-T.

The final reaction mixture, comprising the crude ester of 2,4,5-T, preferably after removal of the salt therein by decantation, filtration, centrifuging or other suitable methods, may be used directly as a plant growth regulator, if desired, after adjustment of the final reaction mixture to an appropriate concentration, addition of suitable emulsifying agents, or the like.

Or, the final reaction mixture may be desalted and processed to remove the polyhydric alcohol and the entraining agent therefrom to produce 2,4,5-T ester in concentrated form for further use as desired.

Also, the final reaction mixture, either as produced or after removal of the polyhydric alcohol therefrom may be hydrolyzed to form the free 2,4,5-T acid for further use as desired.

The process of this invention, broadly and briefly described above, involves the production of some water, resulting from the reaction of the polyhydric alcohol with the alkali metal hydroxide to form an alkali metal derivative. It has been discovered that this water has a pronounced inhibiting action on the hydrolytic reaction and to reduce such inhibiting action as much as possible the prior art procedures have maintained the water concentration at a low level by use of large volumes of reaction medium. As previously set forth, satisfactory results are obtained in prior art procedures only by using at least two pounds polyhydric alcohol and preferably about 3.5 pounds polyhydric alcohol per pound of 1,2,4,5-tetrachlorobenzene. In accordance with this invention, water formed in the process of this invention is rapidly removed by distillation of the entraining agent present and in consequence highly successful results are obtained when as little as 0.5 to 0.6 pound or even less, of polyhydric alcohol is employed per pound of 1,2,4,5-tetrachlorobenzene. This results in many advantages. Equipment of relatively small size is capable of producing relatively large quantities of the desired product whether it be 2,4,5-trichlorophenol or a 2,4,5-T ester. Recovery of the reaction medium is greatly simplified with respect to size of equipment, heat and power requirements and the like. If desired, recovery of the reaction medium may be omitted entirely without too much effect on costs.

For the better understanding of this invention the following illustrative but non-limiting examples thereof are given:

Example 1

Two hundred and sixteen parts by weight (one mole) 1,2,4,5-tetrachlorobenzene, 88 parts by weight sodium hydroxide (2.2 moles), 125 parts by weight propylene glycol and about 40–45 parts by weight toluene are placed in a reaction vessel provided with an agitator and a total condenser discharging to a water trap provided with an automatic return line to the reaction vessel for non-aqueous distillate. The mixture is stirred and gradually heated until all sodium hydroxide has dissolved, the temperature being held at 125–135° C. until solution of sodium hydroxide is complete. After the sodium hydroxide has dissolved, the water trap is filled to the level of the automatic return line with toluene and the reaction mixture is gradually heated to 150° C. and maintained at this temperature until a sample of the reaction mixture is almost completely soluble or is completely soluble in ten volumes of water. During the reaction period, water is removed from the water trap when required.

The temperature during hydrolysis may be varied over wide limits, for example, from 140° to 200° C., more or less. As would be expected, the time required to complete the hydrolysis varies inversely with the reaction temperature; thus, at 200° C. the reaction is complete or essentially complete after three hours while at 160–165° C. some 7–8 hours are required.

When it is desired to operate at high temperatures it may be difficult or impossible to achieve such high temperatures with the proportions given in this example. However, by omitting a portion of the toluene, the desired temperature may be reached. Or, in the early stages of the reaction, sufficient toluene may be removed from the water trap (along with water that has collected) to produce a reaction mixture of the proper composition to give the desired reaction temperature.

While toluene has been specified in this example, any material that is unreactive with the reaction medium or the reactants and capable of entraining water during distillation may be employed. However, aromatic hydrocarbons, such as benzene, toluene and the xylenes are readily available and inexpensive materials meeting these criteria and the use of one of these entraining agents is preferred. It should be noted however that the xylenes have a rather high boiling point and accordingly are not too suitable for use if the hydrolysis is conducted at a temperature in the lower portion of the range previously given and accordingly toluene or benzene are preferably employed. Xylenes however are eminently suitable for use if the hydrolysis is conducted at a temperature in the upper portion of the range previously given.

After hydrolysis was complete or essentially complete, the reaction mixture was cooled to 110° C. or lower and 145 parts by weight ethyl chloroacetate were added. The resulting mixture was heated to 125° C. and maintained at this temperature until a neutral reaction was obtained (about 30 minutes). Propylene glycol was removed by distillation at 15–20 mm. pressure and the salt was separated from the residue comprising the ethyl ester of 2,4,5-T. Yield, 80% of theory, based on 1,2,4,5-tetrachlorobenzene.

Chloroacetic acid esters of other monohydric alcohols, such as methyl, isopropyl and butyl alcohols, may be employed in place of ethylchloroacetate. (See also Example 4.)

*Example 2*

Similar to Example 1, with the exception that 250 parts by weight propylene glycol were employed. Ester yield, 87.5–90.0% theory in a series of experiments, based on 1,2,4,5-tetrachlorobenzene.

*Example 3*

The hydrolysis of 1,2,4,5-tetrachlorobenzene is conducted exactly as set forth in Example 1. After the hydrolysis is complete the 2,4,5-trichlorophenol containing mixture is cooled to 110° C. or less and treated with glycol bis(chloroacetate).

After adding the crude glycol bis(chloroacetate) to the reaction mixture from the hydrolysis of 1,2,4,5-tetrachlorobenzene, the resulting combination is heated to 120–135° C. and maintained in this temperature range until a neutral reaction is attained (20–30 minutes). Propylene glycol is recovered from the resulting product by vacuum distillation to give a residue comprising crude 2,4,5-T diester of glycol and salt, this last being easily removed by filtration, decantation, centrifuging or washing with water.

If desired, propylene glycol bis(chloroacetate) may be used in place of glycol bis(chloroacetate).

*Example 4*

Similar to Example 3 except that the butoxyethoxypropanol ester of chloroacetic acid is used in place of glycol bis(chloroacetate).

*Example 5*

Similar to Example 3, except that a polypropylene glycol diester of chloroacetic acid is used in place of glycol bis(chloroacetate). This polypropyleneglycol diester may be prepared by processing 127 parts by weight chloroacetic acid, 100.4 parts by weight of polypropylene glycol of approximately 150 molecular weight, 15 parts by weight of toluene and one part by weight concentrated sulfuric acid.

While propylene glycol is employed in the previous examples as the reaction medium for the hydrolysis of 1,2,4,5-tetrachlorobenzene, this invention is not restricted thereto, polyhydric alcohols in general being operative such as glycol and glycerol. However, all points of view considered, propylene glycol appears best for the purpose. Glycol, for example, appears to be attacked to a certain extent by sodium hydroxide at the concentrations used and under the temperatures that prevail. That such other polyhydric alcohols are operative is shown by the following example:

*Example 6*

A mixture of 216 parts by weight 1,2,4,5-tetrachlorobenzene, 1113 parts by weight glycol, 93.5 parts by weight sodium hydroxide and 20–25 parts by weight toluene was processed by the method and means of Example 1 with the exception that a hydrolysis temperature of 200° C. was employed, the hydrolysis being complete after three hours. The hydrolysis mixture was treated with glycol bis(chloroacetate) and the esterification reaction and recovery of product followed the corresponding procedures of Example 3. Yield of pure ester, 90–95% theory, based on 1,2,4,5-tetrachlorobenzene.

While this invention has been described in connection with the hydrolysis of 1,2,4,5-tetrachlorobenzene to 2,4,5-trichlorophenol, it is not limited thereto. Thus, 1,2,4-trichlorobenzene, when treated in accordance with this invention, gives rise to 2,5-dichlorophenol which may be isolated as such or converted into an ester of 2,5-dichloro phenoxyacetic acid which may in turn be hydrolyzed to the free acid. Similarly, 1,2,3-trichlorobenzene may be hydrolyzed to a mixture of 2,3-dichlorophenol and 2,6-dichlorophenol while 1,3,5-trichlorobenzene gives rise to 3,5-dichlorophenol.

Similarly, 1,2,3,5-tetrachlorobenzene may be hydrolyzed to 2,3,5-trichlorophenol and pentachlorobenzene to 2,3,5,6-tetrachlorophenol together with some 2,3,4,5-tetrachlorophenol.

The corresponding polybromo and polyiodobenzenes are more easily hydrolyzed than the polychlorobenzenes to polyhalophenols which produce highly active polyhalophenoxyacetic acids. However, due to the relatively high cost of the polybromo and polyiodobenzenes, they are hardly of practical interest.

By the process of this invention it is possible to convert benzene substituted with three or more halogen atoms into a polyhalophenol containing one less halogen atom than the halogenated hydrocarbon charge. The resulting halogenated phenol may be converted into any desired ester of the corresponding phenoxyacetic acid and the resulting ester may be hydrolyzed to produce the free acid or an alkali metal or ammonium salt thereof.

While this invention has been described exclusively in connection with the preparation of polyhalophenoxyacetic acids and esters thereof, it is not limited thereto. By appropriate changes in reactants, which changes will now be obvious, polyhalophenoxy aliphatic acids in general and their esters may be prepared. Thus, instead of employing haloacetic acid esters of monohydric and polyhydric alcohols as described in the preceding examples, monohydric and polyhydric alcohol esters of halo-aliphatic acids higher and lower in the homologous series than acetic acid may be employed, such as monohydric and polyhydric alcohol esters of beta chloropropionic acid, gamma chlorobutyric acid, and the like. Chloroformic acid esters may be employed if desired but the resulting polyhalophenoxyformic acid esters have no appreciable plant growth regulating ability and the polyhalophenoxyformic acids are unstable.

The types and characteristics of suitable entraining agents have been discussed previously. When conditions are propitious, one of the reactants may be used as the entraining agent. Thus, in the hydrolysis of 1,2,4-trichlorobenzene, this polyhalobenzene may be made to serve as the entraining agent as well as a reactant. However, its boiling point is rather high (213° C.) so that it is necessary to conduct the reaction at a high temperature in order to have the 1,2,4-trichlorobenzene serve both as an entraining agent and a reactant. The other trichlorobenzenes are even less suitable as combined reactants-entraining agents as they are solids at room temperature which results in some difficulty in returning them from the water trap to the reaction vessel.

In the examples previously set forth the polyhydric alcohol, alkali metal hydroxide, entraining agent and polyhalobenzene were all present at the initiation of the reaction. This procedure is convenient but is not essential and the invention is not limited thereto. If desired, the polyhydric alcohol, alkali metal hydroxide and entraining agent may be boiled until water is not longer evolved, following which the polyhalobenzene is added (if desired, subsequent to the removal of entraining agent present) and the hydrolytic action is then allowed to proceed. The reaction occurs in two quite well defined steps. The first involves the production and elimination of water. This step proceeds comparatively rapidly and during this stage very little hydrolysis of polyhalobenzene occurs due to the previously mentioned inhibiting action of water. After the water has been eliminated, the slower hydrolytic reaction begins. Obviously, it is not necessary to have the polyhalobenzene present during the water production and elimination stage nor is it necessary to have an entraining agent present during the subsequent hydrolysis stage but it will be obvious from the preceding examples that no harm is done if the polyhalobenzene is present in the first stage and if entraining agent is present in the second and it is usually more convenient to operate in this manner.

Obviously, if desired, the production and elimination of water may be dispensed with if the required alkali metal derivative of the polyhydric alcohol is prepared by the interaction of the polyhydric alcohol with the appropriate amount of alkali metal. However, since alkali metals are considerably more costly than the corresponding alkali metal hydroxides and since the production and elimination of water in accordance with the procedures previously described is a rapid and simple process it is usually more economic to form the alkali metal derivative of the polyhydric alcohol as has been described in the examples.

Be it remembered, that while this invention has been described in connection with specific details and specific examples thereof, these are illustrative only and are not to be considered limitations on the spirit or scope of said invention except in so far as these may be incorporated in the appended claims.

I claim:

1. A process of preparing 2,4,5-trichlorophenoxy lower fatty acid esters, comprising forming a mixture of an alkali metal hydroxide, a polyhydric alcohol selected from the group consisting of ethylene glycol and propylene glycol and an entraning agent, said entraining agent being unreactive with the other components of said mixture, heating said mixture with removal of entraining agent and water entrained thereby, adding 1,2,4,5-tetrachlorobenzene to the resulting anhydrous mixture, the weight of polyhydric alcohol in the mixture so formed being from 0.5 to 1.25 times the weight of 1,2,4,5-tetrachlorobenzene therein, continuing heating for a time sufficient to hydrolyze a chlorine atom of said 1,2,4,5-tetrachlorobenzene, adding an ester of a chloro-lower fatty acid to the resulting reaction product and continuing heating until condensation is at least essentially complete.

2. A process of preparing 2,4,5-trichlorophenoxy lower fatty acid esters, comprising forming a mixture of an alkali metal hydroxide, a polyhydric alcohol selected from the group consisting of ethylene glycol and propylene glycol, 1,2,4,5-tetrachlorobenzene and an entraining agent, said entraining agent being unreactive with the other components of said mixture, said mixture being further characterized by the fact that the weight of polyhydric alcohol therein is from 0.5 to 1.25 times the weight of 1,2,4,5-tetrachlorobenzene therein, heating said mixture with removal of entraining agent and water entrained thereby, continuing heating the resulting anhydrous reaction mixture for a time sufficient to hydrolyze a chlorine atom of said 1,2,4,5-tetrachlorobenzene, adding an ester of a chloro-lower fatty acid to the resulting reaction product and continuing heating until condensation is at least essentially complete.

3. A process of preparing polychlorophenoxy lower fatty acid esters comprising forming a mixture of an alkali metal hydroxide, a polyhydric alcohol selected from the group consisting of ethylene glycol and propylene glycol, and a polychlorophenol, heating said mixture with removal of water therefrom, adding an ester of a chloro-lower fatty acid to the resulting anhydrous reaction mixture and continuing heating until condensation is at least essentially complete.

4. A process of preparing polychlorophenoxy lower fatty acid esters, comprising forming a mixture of an alkali metal hydroxide, a polyhydric alcohol selected from the group consisting of ethylene glycol and propylene glycol, a polychlorophenol and an entraining agent, said entraining agent being unreactive with the other components of said mixture, heating said mixture with removal of entraining agent and water entrained thereby, adding an ester of a chloro-lower fatty acid to the resulting anhydrous reaction mixture and continuing heating until condensation is at least essentially complete.

5. A process for the production of polychlorophenoxy lower fatty acid esters which comprises reacting a polychlorophenol with substantially anhydrous potassium hydroxide in the presence of a polyhydric alcohol selected from the group consisting of ethylene glycol and propylene glycol, removing the water product of reaction, condensing with the resulting potassium polychlorophenate under substantially anhydrous conditions, a lower fatty acid ester having a functional group reactive with the potassium of said phenate, said group being attached to a carbon atom of the acid portion of said ester, and recovering the polychlorophenoxy lower fatty acid ester so formed as the product of the reaction.

6. A process for the production of polychlorophenoxy lower fatty acid esters which comprises reacting a polychlorophenol with substantially anhydrous potassium hydroxide in the presence of a polyhydric alcohol selected from the group consisting of ethylene glycol and propylene glycol and an entraining agent, said entraining agent being unreactive with the other components of said mixture, removing the water product of reaction concurrently as the reaction proceeds by distillation of said entraining agent and water entrained thereby, condensing with the resulting potassium polychlorophenate under substantially anhydrous conditions, a lower fatty acid ester having a functional group reactive with the potassium of the said phenate, said group being attached to a carbon atom of the acid portion of said ester, and recovering the polychlorophenoxy lower fatty acid ester so formed as the product of the reaction.

References Cited in the file of this patent

UNITED STATES PATENTS

| | | |
|---|---|---|
| 2,010,727 | Kirstahler et al. | Aug. 6, 1935 |
| 2,509,245 | Nikawitz | May 30, 1950 |
| 2,769,833 | Weil | Nov. 6, 1956 |

OTHER REFERENCES

Hackh's Chemical Dictionary (1944), pages 2 and 26.
Newman: J. Am. Chem. Soc., 69, 718, 722–3 (1947).
Mataix et al.: Afinidad, 27, 546 (1950).
Webster's New International Dictionary, 2nd ed., unabridged (1950), pages 8 and 61.
The Condensed Chemical Dictionary, Reinhold (1956), pages 2 and 33.